US008332503B2

(12) United States Patent
Takagi

(10) Patent No.: US 8,332,503 B2
(45) Date of Patent: Dec. 11, 2012

(54) MESSAGE ABNORMALITY AUTOMATIC DETECTION DEVICE, METHOD AND PROGRAM

(75) Inventor: Ryuichi Takagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1133 days.

(21) Appl. No.: 11/205,621

(22) Filed: Aug. 17, 2005

(65) Prior Publication Data

US 2006/0256714 A1  Nov. 16, 2006

(30) Foreign Application Priority Data

May 11, 2005 (JP) ................................. 2005-137961

(51) Int. Cl.
 *G06F 15/173* (2006.01)
 *G06F 15/16* (2006.01)
(52) U.S. Cl. ......... 709/224; 709/203; 709/204; 709/206
(58) Field of Classification Search .......... 709/223–229, 709/203, 204, 206; 726/1–26
See application file for complete search history.

(56) References Cited

U.S. PATENT DOCUMENTS

| | | | |
|---|---|---|---|
| 6,715,005 B1 * | 3/2004 | Rodriguez et al. ............... 710/41 |
| 6,792,546 B1 * | 9/2004 | Shanklin et al. ................. 726/23 |
| 2002/0183984 A1 * | 12/2002 | Deng et al. ......................... 703/1 |
| 2003/0074605 A1 | 4/2003 | Morimoto et al. |
| 2003/0177192 A1 * | 9/2003 | Umeki et al. .................. 709/206 |
| 2003/0221005 A1 * | 11/2003 | Betge-Brezetz et al. ..... 709/224 |
| 2004/0015601 A1 * | 1/2004 | Whitson ......................... 709/235 |
| 2004/0117478 A1 * | 6/2004 | Triulzi et al. ................. 709/224 |
| 2004/0133672 A1 * | 7/2004 | Bhattacharya et al. ........ 709/224 |
| 2004/0193943 A1 * | 9/2004 | Angelino et al. .................. 714/4 |
| 2004/0250169 A1 | 12/2004 | Takemori et al. |
| 2005/0021740 A1 * | 1/2005 | Bar et al. ........................ 709/224 |
| 2005/0027835 A1 * | 2/2005 | Raikar et al. .................. 709/222 |
| 2005/0108384 A1 * | 5/2005 | Lambert et al. ............... 709/224 |
| 2005/0125551 A1 * | 6/2005 | Oh et al. ........................ 709/230 |
| 2006/0026134 A1 * | 2/2006 | Takahashi .......................... 707/3 |
| 2006/0046237 A1 * | 3/2006 | Griffin et al. ................. 434/322 |
| 2006/0095584 A1 * | 5/2006 | Deolaliker et al. ........... 709/240 |
| 2006/0212510 A1 * | 9/2006 | Nielsen ......................... 709/203 |

(Continued)

FOREIGN PATENT DOCUMENTS

JP  6-4318 A  1/1994

(Continued)

OTHER PUBLICATIONS

Lee et al. "Learning Patterns from Unix Process Execution Traces for Intusion Detection" AAAI Workshop: AI approaches to Fraud Detection and Risk management (1997).*

(Continued)

*Primary Examiner* — Kenny Lin
(74) *Attorney, Agent, or Firm* — Fujitsu Patent Center

(57) ABSTRACT

In order to provide a message abnormality automatic detection device, method and program for accurately detecting messages indicating abnormalities requiring response from a large amount of messages, the message abnormality automatic detection device 1 comprises a message collection unit 2 for collecting messages, a learning unit 3 for extracting patterns from the collected messages, a normal pattern memory unit 4 for storing normal patterns, a collation unit 5 for collating the collected messages with normal patterns and detecting message abnormalities, a warning unit 6 for outputting abnormalities to display 9 and the like, and a definition unit 7 for storing the definition data related to normal patterns.

11 Claims, 15 Drawing Sheets

U.S. PATENT DOCUMENTS

2008/0104523 A1* 5/2008 Umeki et al. ............. 715/751

FOREIGN PATENT DOCUMENTS

| JP | 9-114703 A | 5/1997 |
|---|---|---|
| JP | 2001-292143 | 10/2001 |
| JP | 2003-122599 A | 4/2003 |
| JP | 2004-318552 A | 11/2004 |

OTHER PUBLICATIONS

Lane et al. "Sequence Matching and Learning in Anomaly Detection for Computer Security" AAAI Workshop: AI Approaches to Fraud Detection and Risk Management (1997).*

Japanese Office Action, Partial English Language Translation, mailed Oct. 26, 2010 for corresponding Japanese patent application No. 2005-137961.

* cited by examiner

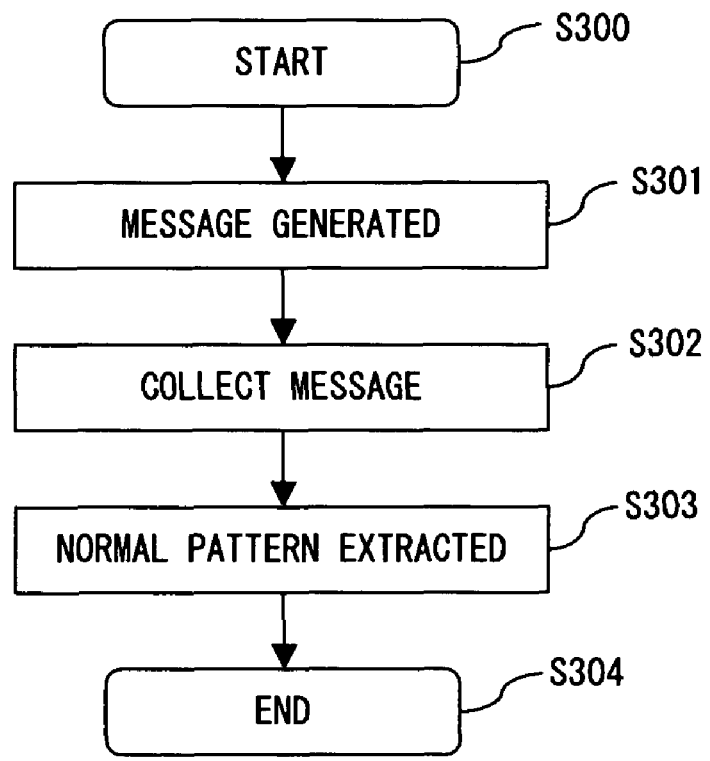
F I G. 3

| MAXIMUM CONSECUTIVE MESSAGE NUMBER |
|---|
| MINIMUM REFERENCE VALUE (%) |
| MAXIMUM REFERENCE VALUE (%) |

FIG. 7

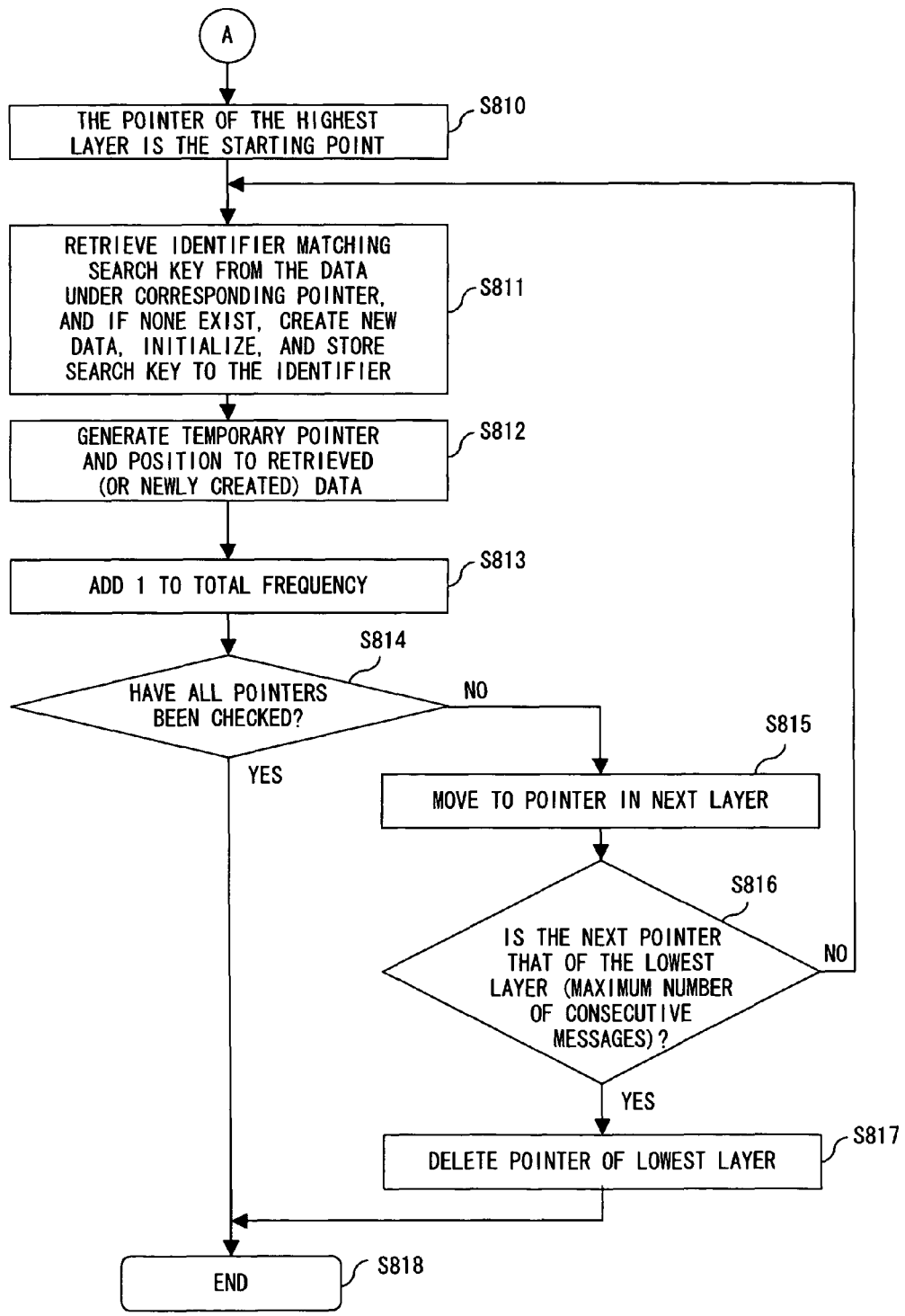
F I G. 8B

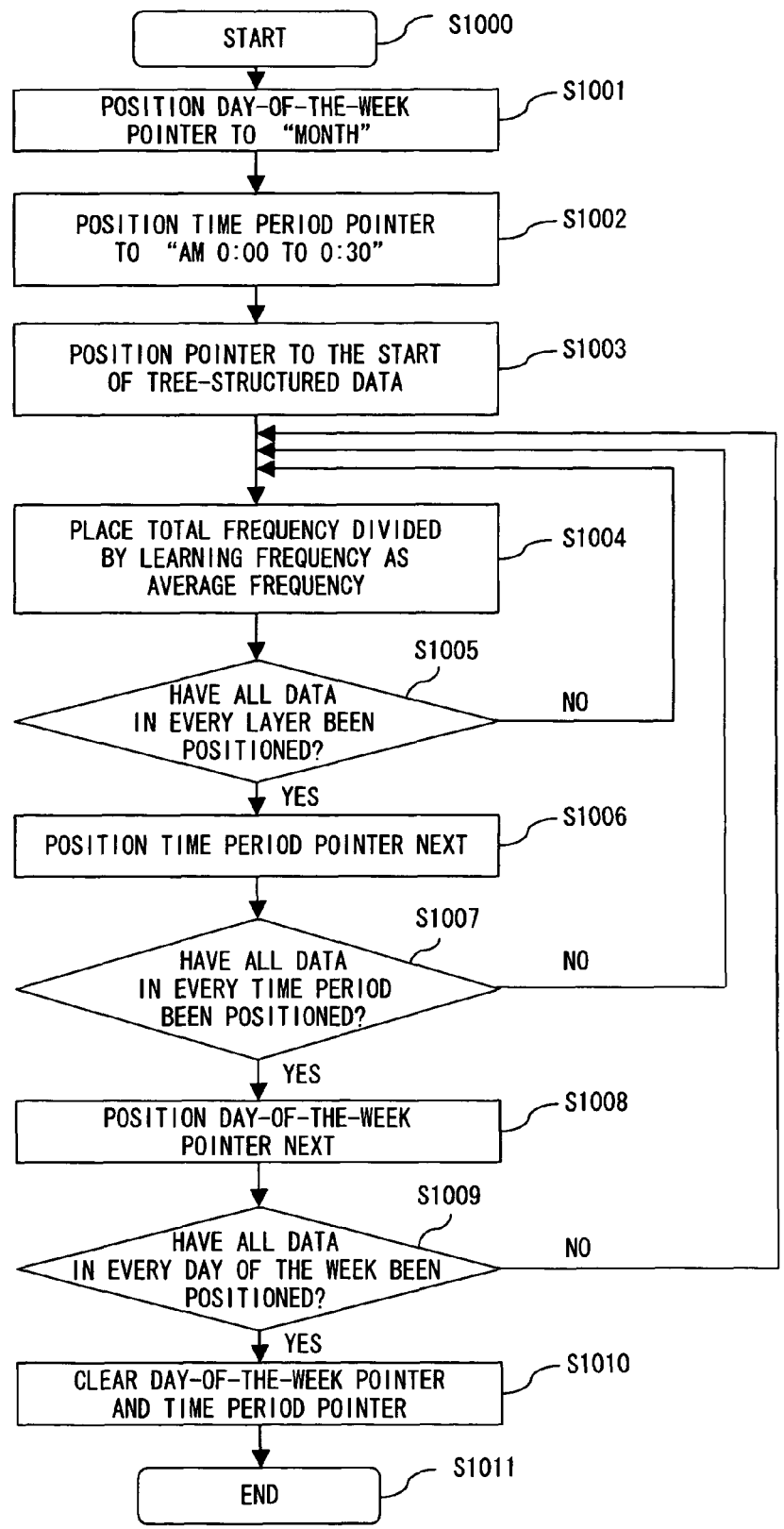
F I G. 1 0

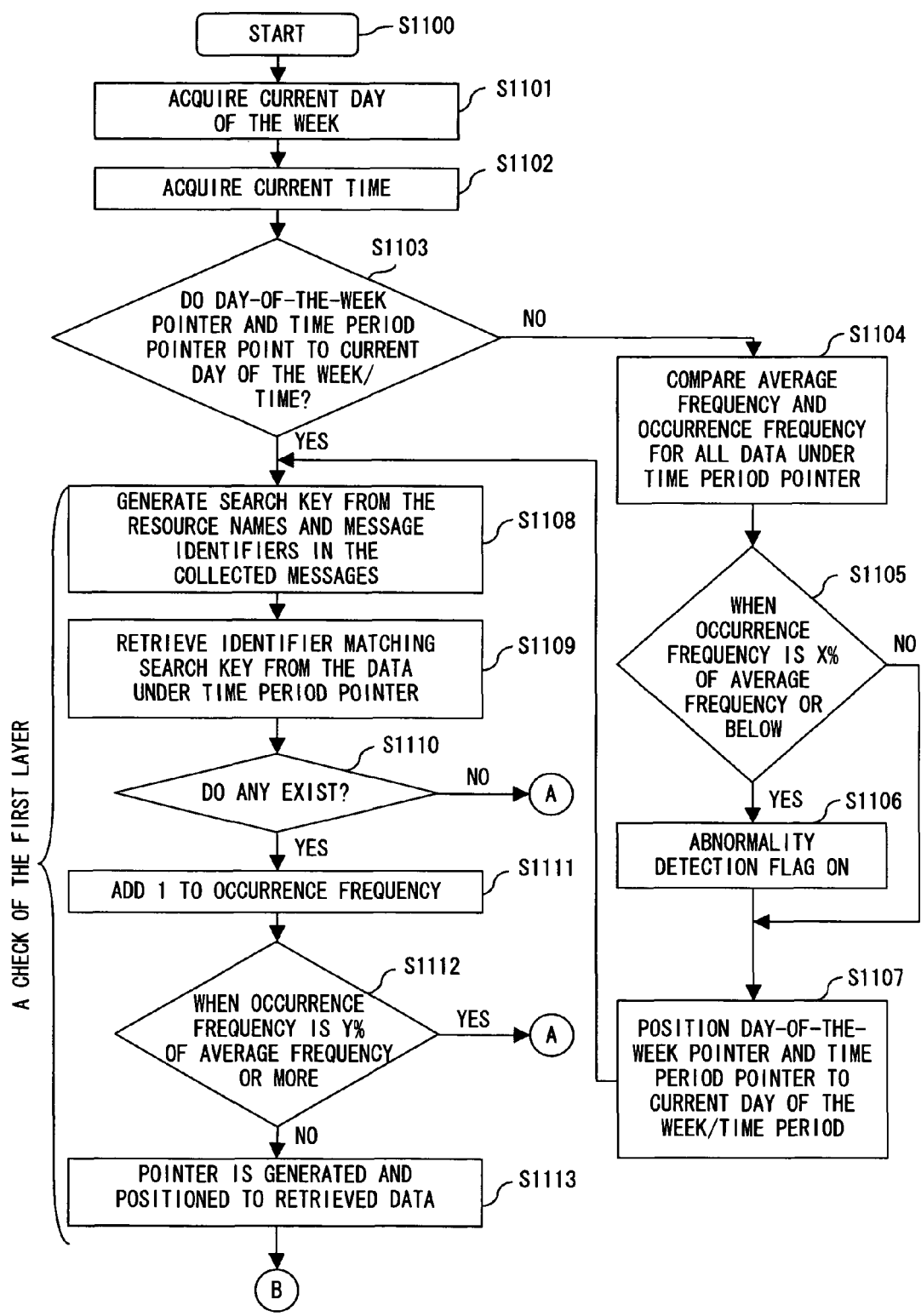
F I G. 1 1 A

★WARNING: MORE MESSAGES THAN NORMAL PATTERNS ARE OUTPUT
- NORMAL PATTERN: 3 TIMES
- DETECTED PATTER: 10 TIMES
- MESSAGE PATTERN (2 CONSECUTIVE MESSAGES)
    SV01 : 1001 : ABNORMAL RETURN OF TRANSMISSION REQUEST
    SV01 : 1002 : RETRANSMISSION SUCCESSFUL

MESSAGE ABNORMALITY AUTOMATIC DETECTION DEVICE, METHOD AND PROGRAM

BACKGROUND OF THE INVENTION

1. Field of the Invention

The present invention relates to a message abnormality automatic detection device, method and program for detecting abnormalities in messages generated in a distributed system composed of a plurality of information processing devices and the like.

2. Description of the Related Art

Recent information processing systems often implement a form of distributed system wherein a plurality of information processing devices, software, and the like operate in concert with each other to actualize predetermined features.

In a distributed system, because large amounts of various messages are output from information processing devices comprising the distributed system or respective hardware and software comprising the information processing devices, a feature is provided for collecting and displaying these messages within one console.

However, even if the messages output from the distributed system are displayed within a console because of the large amount, this is problematic in that it is difficult to know which of these messages are truly important.

In Japanese Patent Laid-open Publication 2001-292143, a monitoring unit has a pattern file to which the characteristics of failure messages are entered beforehand, and a failure detection system, wherein whether or not a message is a failure message is determined by comparison with operation state message and individual patterns within the pattern file, is disclosed.

However, although current operation management tools have a feature for filtering non-critical messages, the definition of which message to output and which message to not output (filtering definition) must be performed manually for each message. As long as there are large numbers of message types, determination of their importance is difficult and actual definition is difficult.

In addition, although, ordinarily, an importance level code indicating the level of importance ("information level", "warning level", and "critical level" etc., if there are three levels) is attached to the messages, there are cases wherein the degree of importance differs with the system environment (system topology/operating conditions, etc.) even if the message is the same.

For example, an "information level" message stating "HTTP services have been terminated" is not a problem during an intentional termination when business is closed for the night. However, if this is output during normal operations, this is a failure of some sort, such as an operation error, and is a critical message which requires urgent response.

Furthermore, there are instances wherein the true degree of importance cannot be known by only one message and must be determined by the patterns of plural messages.

For example, with regards to the following three messages,
(A) "abnormal return of request to send"
(B) "successfully retransmitted"
(C) "network communication delay",
if messages (A)-(B) are output sequentially, there is no particular need for a response. However, if messages (A)-(C) are output sequentially and message (B) is not output, it is assumed that some sort of abnormality exists, and there is need for examination. In addition, even with the messages (A)-(B) pattern, if they are output in large amounts over a short period of time, it is assumed that some sort of abnormality exists, and there is need for examination.

SUMMARY OF THE INVENTION

The present invention has been developed to solve the above-mentioned problems, and aims at providing a message abnormality automatic detection device, method and program for accurately detecting messages indicating abnormalities which require a response from a large number of messages.

In order to resolve this objective, the message abnormality automatic detection device according to the present invention comprises: a message collection unit for collecting messages generated by a distributed system; a normal pattern memory unit for storing a normal pattern of which the constituent element is message information data which are a combination of one or two or more consecutive messages generated when the distributed system is operating normally and have at least identifiers which uniquely identify the messages and the number of times each message indicated by the identifiers are generated; and a collation unit for referencing the normal patterns stored within the normal pattern memory unit, retrieving the identifier which matches the identifier of the message collected within the message collection unit, counting the number of times the message indicated by the identifier is generated if relevant identifier exists, and determining abnormality if the number of times generated is higher or lower than a predetermined value or if relevant identifier does not exist.

According to the present invention, the collation unit collates the message collected in the message collection unit and the normal pattern which is a combination of one or two or more consecutive messages generated when the distributed system is operating normally and determines abnormality if the number of times generated is higher or lower than a predetermined value or if relevant identifier does not exist, and therefore, messages which differ from the messages generated when the distributed system is operating normally and the combination of consecutive messages can be detected as messages indicating abnormalities which require response.

Furthermore, the message abnormality automatic detection process according to the present invention is realized by a message abnormality automatic detection method and a message abnormality automatic detection program for enabling an information processing device to perform: message collection processing for collecting messages generated by a distributed system; and collation processing for referencing the normal pattern memory unit for storing normal pattern of which the constituent element is message information data which are a combination of one or two or more consecutive messages generated when the distributed system is operating normally and have at least identifiers which uniquely identify the messages and the number of times each message indicated by the identifiers are generated, retrieving the identifier which matches the identifier of the message collected through the message collection processing, counting the number of times the message indicated by the identifier is generated if relevant identifier exists, and determining abnormality if the number of times generated is higher or lower than a predetermined value or if relevant identifier does not exist.

In this way, according to the present invention, a message abnormality automatic detection device, method and program for accurately detecting messages indicating abnor-

BRIEF DESCRIPTION OF THE DRAWINGS

FIG. 3 is a flowchart showing an overview of processing when the message abnormality automatic detection device according to this embodiment is in learning mode;

FIG. 7 is a diagram showing an example of a definition unit configuration according to this embodiment;

FIG. 8B is a flowchart showing the details of processing when the message abnormality automatic detection device according to this embodiment is in learning mode;

FIG. 10 is a flowchart showing the switching process from learning mode to operation mode;

FIG. 11A is a flowchart showing the details of processing when the message abnormality automatic detection device according to this embodiment is in operation mode;

DESCRIPTION OF THE PREFERRED EMBODIMENTS

The embodiments of the present invention are described hereafter, based on FIG. 1 to FIG. 12.

Figure 1:
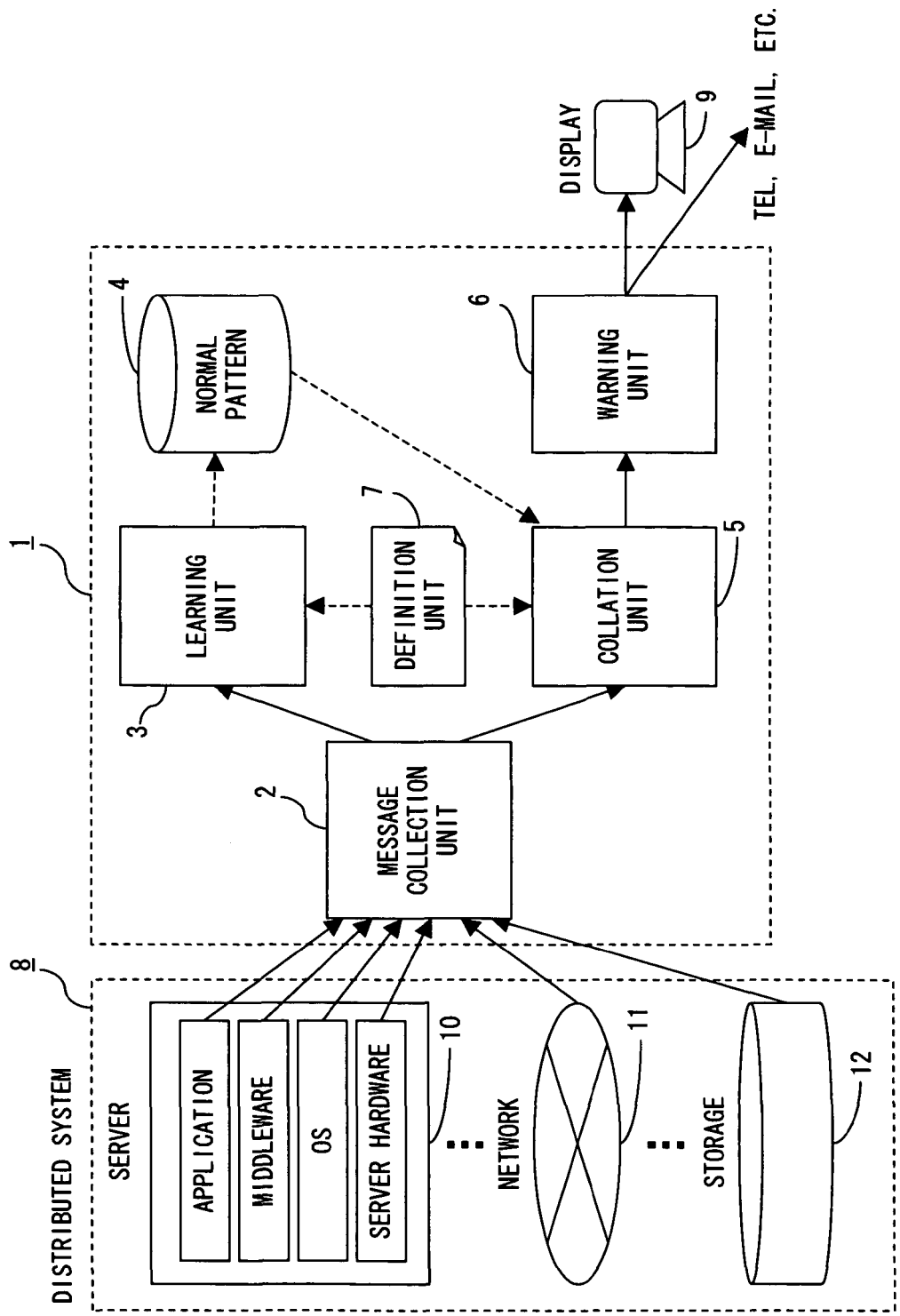
FIG. 1 is a diagram showing an example of the entire configuration of an embodiment according to the present invention.

FIG. 1 is a diagram showing an example of the entire configuration of an embodiment according to the present invention.

The message abnormality automatic detection device 1 shown in FIG. 1 comprises: a message collection unit 2 for collecting messages output from distribution system 8; a learning unit 3 for extracting patterns from the messages collected in the message collection unit 2; a normal pattern memory unit 4 for storing patterns (hereinafter referred to as "normal patterns") extracted in the learning unit 3; collation unit 5 for collating messages collected in the message collection unit 2 and normal patterns stored in the normal pattern memory unit 4 and detecting message abnormalities; a warning unit 6 for outputting abnormalities detected in the collation unit 5 to display 9 and the like; and a definition unit 7 for storing definition data related to normal patterns.

Here, distribution system 8 is a system composed by connecting a plurality of servers 10 and storage 12 by a network 11 or the like, and messages are output to the message collection unit 2 from hardware, OS, middleware or applications comprising each server 10, or storage 12, directly or via network 11 and the like.

The message collection unit 2 collects messages from distribution system 8, outputs these to the learning unit 3 when in learning mode and to the collation unit 5 when in operation mode.

The learning unit 3 gets the maximum number of consecutive messages (hereinafter referred to as maximum message number) with reference to the definition unit 7. Then, with regards to the message transmitted from the message collection unit 2, the learning unit 3 extracts one to the maximum message number of combination patterns (normal patterns) and, at the same time, counts the number of times each message comprising the normal patterns appear (the number of appearances in this case is referred to as "total frequency").

And, the detected normal pattern and total frequency are stored to a predetermined address in the normal pattern memory unit 4.

Meanwhile, the collation unit 5 refers the normal pattern memory unit 4 and retrieves the normal pattern corresponding to the message transmitted from the message collection unit 2. Then, if a corresponding normal pattern exists, the number of times the corresponding message appears (the number of appearances in this case is referred to as "occurrence frequency") is counted. Furthermore, whether or not the corresponding message is abnormal is determined, based on the occurrence frequency and the definition in the definition unit 7, with reference to the average frequency (the value of total frequency divided by learning frequency) of the corresponding message.

The warning unit 6 performs warning through presentation to display 9, notification to a predetermined telephone number, transmission of e-mail to a predetermined e-mail address and the like.

As described above, the message abnormality automatic detection device 1 according to the present invention has two modes, learning mode and operation mode.

In addition, although an instance wherein the message collection unit 2 collects messages directly from each server 10 (applications, middleware, OS and hardware comprising server 10) comprising distributed system 8 in the message abnormality automatic detection device 1 according to the present invention shown in FIG. 1, it goes without saying that messages can also be collected from server 10 via network 11.

The message abnormality automatic detection device 1 according to the present invention can be actualized by an ordinary information processing device.

Figure 2:
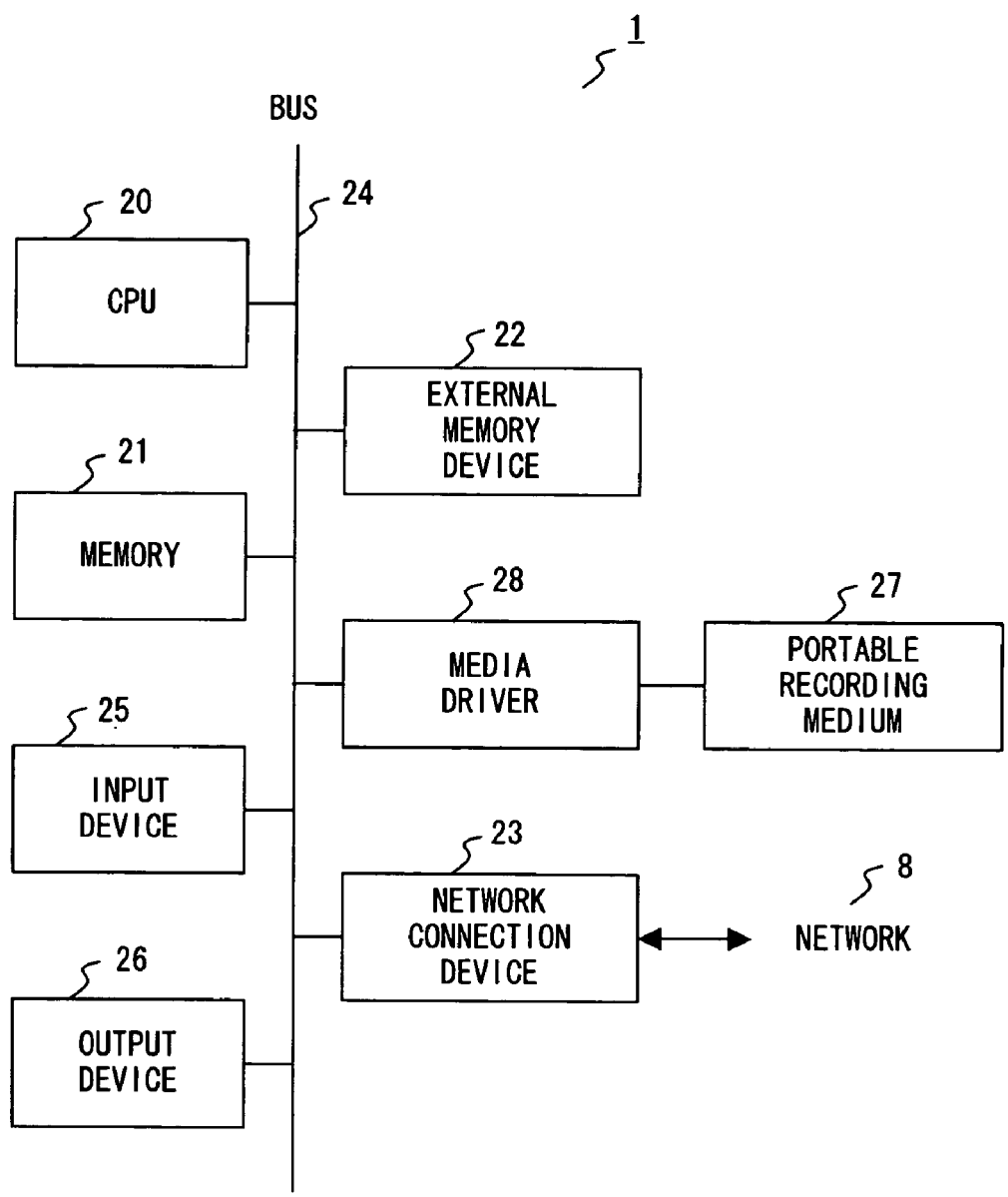
FIG. 2 is a diagram showing an example of the configuration of a message abnormality automatic detection device according to this embodiment.

FIG. 2 is a diagram showing an example of the configuration of the message abnormality automatic detection device according to this embodiment.

The message abnormality automatic detection device 1 shown in FIG. 2 comprises, at least: a CPU 20 for controlling respective constituent elements comprising the message abnormality automatic detection device 1 and, at the same time, performs processing of learning unit 3, collation unit 5 and the like according to the instructions written in the program; a memory 21 for temporarily storing data required to process CPU 20; an external memory device 22 for storing programs, normal patterns and the like; a network connection device 23 for connecting to distribution system 8 via network 11; and bus (data bus) 24 for transmitting and receiving data between respective devices.

In addition, the message abnormality automatic detection device 1 shown in FIG. 2 further comprises: an input device 25 for performing input processing such as instructing CPU 20 to switch between learning mode and operation mode and collecting messages directly from the server 10 using a dedicated line and the like; an output device 26 for showing the message output in warning unit 6 on display 9; and a media driver 28 for driving portable memory medium 27 such as floppy disks and CD-ROMS.

As described above, message collection unit 2, learning unit 3, collation unit 5, and warning unit 6, shown in FIG. 1, can be actualized by the CPU 21 executing commands written in the program. In addition, normal pattern memory unit 4 and definition unit 7 can be actualized by memory 21 or external memory device 22.

Although the entity of the processing of the message abnormality automatic detection device 1 according to this embodiment is the CPU 20, explanations are hereafter made with the processing unit (for example, message collection unit 2, learning unit 3, collation unit 5, etc.) actualized by the CPU 20 as the entity of the processing, in order to simplify the explanation.

Hereafter, the overview of the processing of the message abnormality automatic detection device 1 according to this embodiment is explained based on FIG. 3 to FIG. 7, and the processing of the message abnormality automatic detection device 1 is explained in further detail based on FIG. 8A to FIG. 12.

FIG. 3 is a flowchart showing an overview of the processing when the message abnormality automatic detection device 1 according to this embodiment is in learning mode.

In step S301, server 10 comprising distributed system 8 or hardware, OS, middleware and applications comprising server 10, network 11, and storage 12 (including Storage Area Network (SAN), Network Attached Storage (WAS), etc.) generates a message if they detect that, for example, network communication cannot be performed.

If a message is generated in distributed system 8, the message collection unit 2 of the message abnormality automatic detection device 1 collects the message from the device in which the message was generated. Then, the relevant message is notified (transmitted) to the learning unit 3 (step S302).

The learning unit 3 extracts a normal pattern from the message sent from the message collection unit 2 and, at the same time, counts the occurrence frequency of the message comprising the normal pattern and stores the relevant normal pattern to the normal pattern memory unit 4 (step S303).

Figure 4:
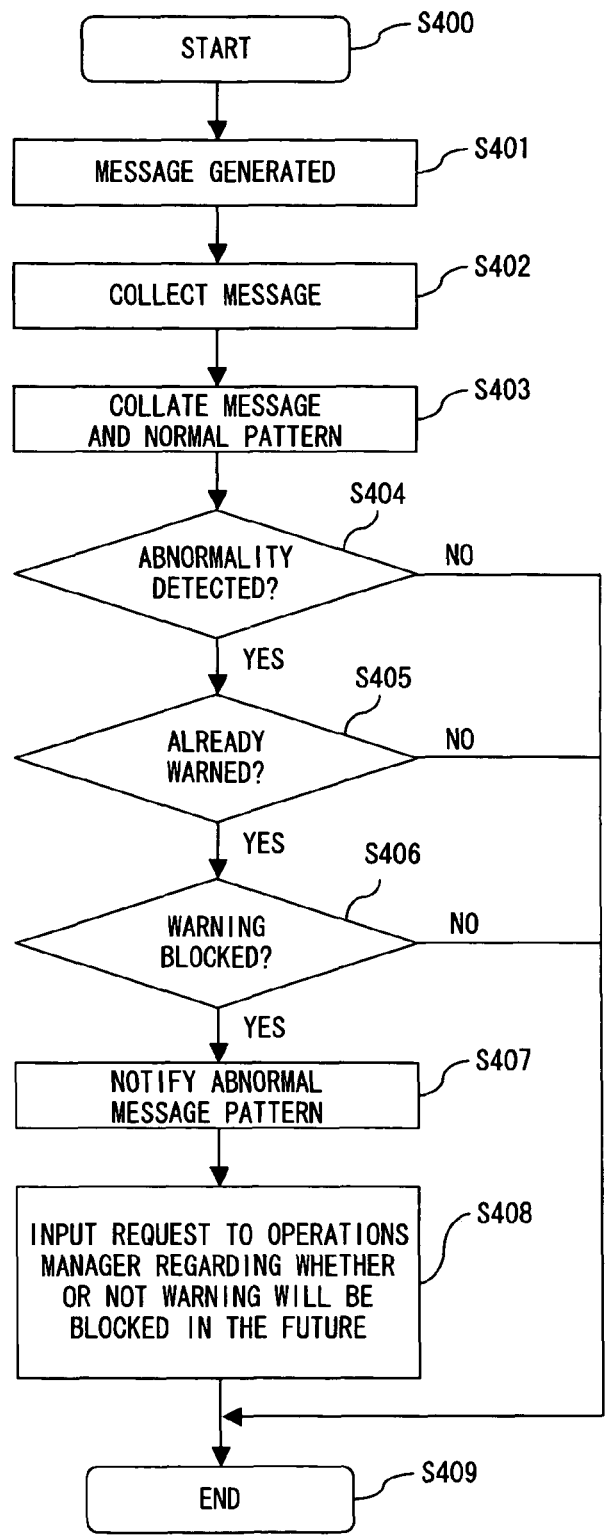
FIG. 4 is a flowchart showing an overview of processing when the message abnormality automatic detection device according to this embodiment is in operation mode.

FIG. 4 is a flowchart showing an overview of the processing when the message abnormality automatic detection device according to this embodiment is in operation mode.

In step S401, when a message is generated from distributed system 8, the message collection unit 2 advances the process to step S402 and starts the message collection processing.

Then, the message collection unit 2 collects the message from distributed system 8 and, at the same time, notifies (transmits) collation unit 5 of the collected message.

After message is received from message collection unit 2, the collation unit 5 advances the process to step S403. Next, whether or not a message which corresponds to the message sent from message collection unit 2 exists is checked, with reference to the normal patterns stored in the normal patterns unit 4.

Then, in step S404, if the corresponding message exists and message abnormality is not detected, the process advances to step S409 and is completed normally.

In addition, in step S404, if there are no corresponding messages or message abnormality is detected, the process advances to step S405, and whether or not this is a previously warned message abnormality is checked. If warning has already been done, the process advances to step S409 and is completed normally. If warning has not been previously done, the process advances to step S406.

Then, in step S406, collation unit 5 checks whether or not warning is blocked by setting performed by operations manager or the like. If it is set to warning block, the process advances to step S409 and completes normally. If it is not set to warning block, information of message abnormality detected in step S403 is notified to warning unit 6 and the process advances to step S407.

In step S407, the warning unit 6 presents the message abnormality notified by the collation unit 5 in display 9, notifies this by phone to a predetermined phone number, or notifies this by e-mail to a predetermined e-mail address.

Next, an inquiry of whether or not subsequent corresponding warnings will be blocked is presented on display 9, and setting to block the warning is recommended to the operations manager or the like. When the relevant setting is completed by the operations manager or the like, the process advances to step S409 and is completed.

In step S405, whether or not a warning has been done for the message detecting message abnormality can, for example, be determined by storing previously warned messages to the external memory device 23 and collating the message abnormality with the detected message.

In addition, the setting for warning block in step S406 can, for example, be determined by storing the flag for every message of which warning is to be blocked to the external memory device 23 and collating the message abnormality with the detected message.

Figure 5:
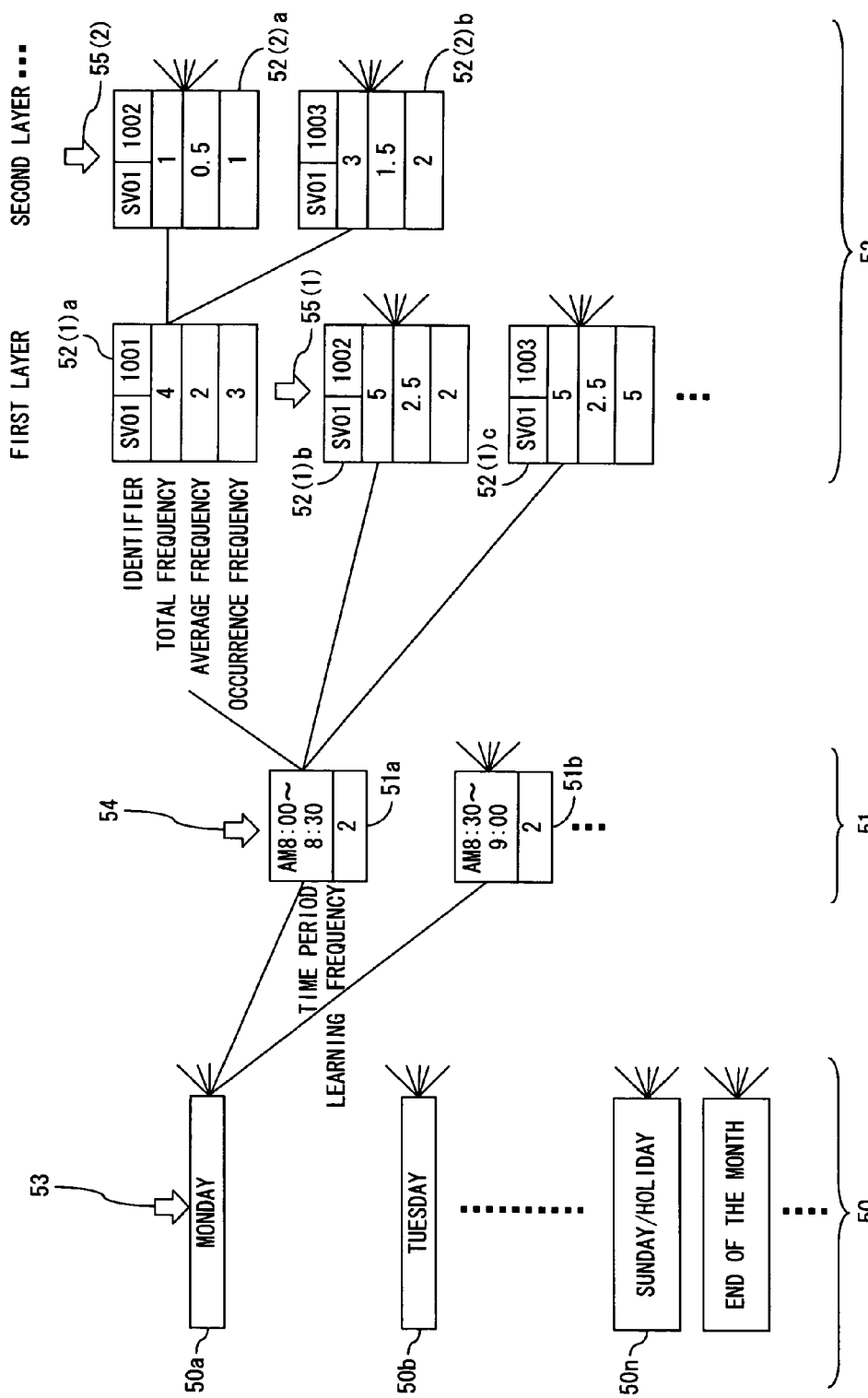
FIG. 5 is a diagram showing an example of the configuration of a normal pattern generated in the learning unit of the message abnormality automatic detection device according to this embodiment.

FIG. 5 is a diagram showing an example of the configuration of a normal pattern generated in the learning unit 3 of the message abnormality automatic detection device 1 according to this embodiment.

The normal pattern shown in FIG. 5 comprises: day-of-the-week data 50 indicating the day of the week, holiday, end of the month, and the like; time period data 51 indicating the time period of each day-of-the-week data 50; and tree-structured message information data 52 for storing information regarding messages collected by the message collection unit 2 during the time periods indicated by each time period data 51.

Further comprised are: day-of-the-week pointer 53, time period pointer 54, and message information pointer 55 indicating the storage location (address) of the day-of-the-week data 50, time period data 51, and the respective levels of message information data 52.

In the explanation below, for example, message information data $52(m)$a indicates a specific message information data 52 in level m (m is an integer). In addition, message information data $52(m)$ indicates an arbitrary massage information data 52 in level m.

Furthermore, for example, message information pointer $55(n)$ indicates message information pointer 55 in level n (n is an integer).

Day-of-the-week data 50 defines the day of the week, Sundays/holidays, and end of the month (hereinafter referred to as "day-of-the-week"). Therefore, data indicating the days of the week and the like are stored in each day-of-the-week data 50a to 50n (for example, day-of-the-week data 50a indicating Monday and day-of-the-week data 50n indicating Sunday/holidays).

Time period data 51 defines time period and comprises data indicating learning frequency, as well.

Time period defines the time period wherein one day or the operating hours of distributed system 8 are divided by predetermined period. Time period data 51 shown in FIG. 5 show time period data 51a of time period "AM 8:00 to 8:30" and time period data 51b of time period "AM 8:30 to 9:00" of a day divided by 30 minute intervals.

In addition, learning frequency indicates the number of times learning is performed during the relevant time period in learning mode. For example, learning frequency "2" shown in time period data 51a under day-of-the-week data 50a indicates that learning was performed twice during "AM 8:00 to 8:30 on Monday".

Message information data 52 comprises identifier generated from a message, the total frequency of messages collected by the message collection unit 2 in learning mode, the average frequency calculated from the total frequency and the learning frequency, and the occurrence frequency of message collected by the message collection unit 2 in operation mode.

In addition, the message information data 52 has a tree structure in accordance with the patterns of the messages collected by the message collection unit 2 in the time period defined by each time period data 51, and a layered structure is formed for the maximum number of consecutive messages defined in definition unit 7 (for example, if the maximum number of consecutive messages defined in definition unit 7 is three, the layered structure also has three layers).

For example, message information data 52(1)a under time period data 51a indicates that corresponding messages were detected four times in learning that was performed twice within the relevant time period. In addition, the average frequency is twice (=total frequency 4 times/learning frequency twice).

Furthermore, because the occurrence frequency of this message information data 52(1)a is three, this indicates that the corresponding message is detected three times in operation mode.

In the day-of-the-week pointer 53 and the time period pointer 54, the storage locations (address) of specific day-of-the-week data 50 and time period data 51 corresponding to the current day of the week and time period obtained from a timer function or the like of the message abnormality automatic detection device 1 are stored (hereinafter, this processing is called "positioning").

In addition, the message information pointer 55 is provided for each layer, and in each layer, the message information data 52 of the last detected message is positioned.

Here, because the normal pattern shown in FIG. 5 has a tree-structure, the day-of-the-week data 50 comprises a pointer to time period data 51 under each day-of-the-week data 50, the time period data 51 comprises pointer to message information data 52 (first layer) under each time period data 51, and the message information data 52 comprises pointer to message information data 52 under each message information data 52.

However, the purpose is not to limit the structure to that shown in FIG. 5. For example, day-of-the-week data 50 and time period data 51 can be a table structure of the days of the week and the time periods corresponding thereto and only the message information data 52 can have a tree-structure.

Figure 6:
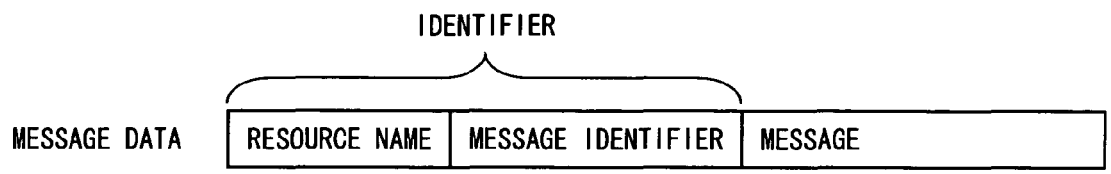
FIG. 6 is a diagram showing an example of a message data configuration according to this embodiment.

FIG. 6 is a diagram showing an example of a message data configuration according to this embodiment.

The message data shown in FIG. 6 comprises a header composed of resource name and message identifier (hereinafter referred to as simply "identifier") and message data.

The resource name is an identifying name assigned beforehand to identify the device or the program generating the message. For example, it is assigned respectively to each server 10 or the applications, middleware, OS, and hardware of server 10, network 11 and storage 12.

Therefore, the host name (for example, SV01) of the server 10 and the like, as shown in Example 1 of FIG. 6) can be used as the resource name, or the host name and the soft name (for example, SV01-Soft01), as shown in Example 2, can be used as well.

In addition, the message identifier is an identifier assigned beforehand to identify message content.

FIG. 7 is a diagram showing an example of a definition unit 7 configuration according to this embodiment.

The definition unit 7 shown in FIG. 7 comprises the maximum consecutive message number, the minimum reference value and the maximum reference value.

The maximum consecutive message number is the maximum value of consecutive messages acknowledged by the learning unit 3 and the collation unit 5. For example, if the maximum consecutive message number is three, the learning unit 3 acknowledges messages sent from the message collection unit 2 as one or two to three consecutive messages, and therefore, a combination of one or two to three consecutive messages are extracted and normal pattern is generated. Thus, message information data 52 at this time has a three-layer structure.

The minimum reference value and the maximum reference value are used as threshold when the collation unit 5 determines whether or not the message collected by the message collection unit 2 is abnormal.

Figure 8A:
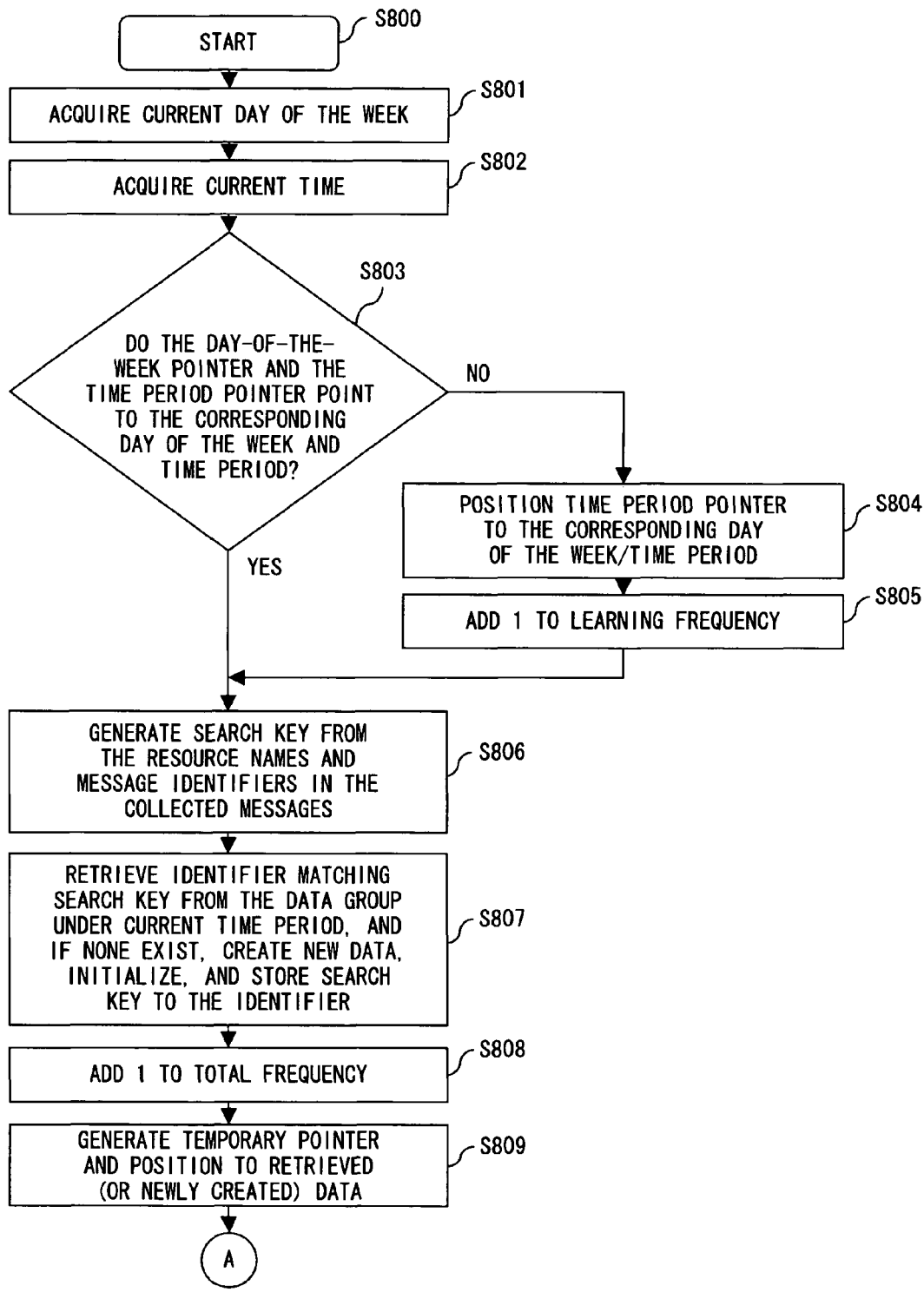
FIG. 8A is a flowchart showing the details of processing when the message abnormality automatic detection device according to this embodiment is in learning mode.

FIG. 8A and FIG. 8B are flowcharts showing the details of processing when the message abnormality automatic detection device 1 according to this embodiment is in learning mode.

When the message abnormality automatic detection device 1 is set to learning mode, the learning unit 3 starts the learning processing and advances to step S801.

In step S801, the learning unit 3 acquires the current day of the week from the timer function or the like of message abnormality automatic detection device 1. Furthermore, the current time is acquired from the timer function or the like of message abnormality automatic detection device 1 in step S802.

When the current day of the week and time are obtained, the learning unit 3 advances to step S803.

In step S803, the learning unit 3 checks whether or not the day of the week and time period, indicated by the day-of-the-week data 50 and time period data 51 positioned by the day-of-the-week pointer 53 and the time period pointer 54, and the current day of the week and time (time period) acquired in step S801 and S802 match.

If they match, the processing advances to step S806. In addition, if they do not match, the processing advances to step S804, and the day-of-the-week pointer 53 and the time period pointer 54 are positioned to the day-of-the-week data 50 and time period data 51 corresponding to the current day of the week and time acquired in step S801 and S802.

Next, the value of the learning frequency of the time period data 51 of the corresponding time period plus one is stored (step S805) and the processing advances to step S806.

In step S806, the learning unit 3 generates identifiers from the collected messages. For example, identifiers (for example, SV011001) are generated from the resource name and the message identifier, as shown in FIG. 6.

When the identifier is generated, the learning unit 3 advances the processing to step S807. Then, message information data 52 having the same identifier, with the corresponding identifier as the search key, is retrieved from message information data 52 group (limited to the first layer) positioned by the corresponding time period pointer 54, with reference to the normal patterns stored in normal pattern memory unit 4.

If there is no corresponding message information data 52, new message information data 52 is generated under time period data 51 of the corresponding time period. Then, the generated message information data 52 is initialized and the identifier is stored.

When the corresponding message information data 52 is detected or a new message information data 52 is generated, the learning unit 3 advances the processing to step S808.

In step S808, the learning unit 3 adds one to the total frequency of message information data 52 detected or newly generated in step S807 and advances the process to step S809.

In step S809, the learning unit 3 generates temporary message information pointer 57(1) and positions it to the message information data 52 detected or newly generated in step S807.

When the positioning of the temporary message information pointer 57 (1) is completed, learning unit 3 advances the processing to step S810.

In step S810, the learning unit 3 acquires the position (address) of message information data 52 positioned by message information pointer 55(1) of the first layer (hereinafter, this processing is referred to as "marking starting point") and advances the processing to step S811.

In step S811, the learning unit 3 retrieves message information data 52 which matches the search key for the message information data 52 of the second layer (the layer after the layer which is the starting point), under the message information data 52 acquired in step S810.

Then, if there is no corresponding message information data 52, message information data 52 is newly created. Next, the generated message information data 52 is initialized and the identifier is stored.

When the corresponding information data 52 is detected or a new corresponding information data 52 is generated, the learning unit 3 advances the processing to step S812.

In step S812, the learning unit 3 generates temporary message information pointer 57(2) and positions it to the message information data 52 detected or newly generated in step S811. Then, the value of the total frequency of corresponding message information data 52 plus one is stored (step S813).

When the foregoing processing is completed, the learning unit 3 advances the processing to step S814. Then, the completion of the processing of step S811 to S813 is checked, with regards to the message information pointers 55 of all layers.

If there is a message information pointer 55 of a layer wherein processing has not been completed, processing advances to step S815 and the message information pointer 55 of the next level becomes the staring point.

In addition, the learning unit 3 checks whether or not the message information pointer 55 which was determined to be the starting point in step S815 is the pointer of the lowest layer. If it is the lowest layer, the processing advances to step S817, and if it is not the lowest layer, the processing advances to step S811, and the processing of step S811 to S816 is performed repeatedly.

In step S817, the learning unit 3 deletes the message information pointer 55 of the lowest layer and advances the processing to step S818.

In step S818, the learning unit 3 positions message information pointer 55 to message information data 52 positioned by temporary message information pointer 57 for all layers. Then, the temporary message information pointers 57 of all layers are deleted and the processing is completed.

Figure 9A:
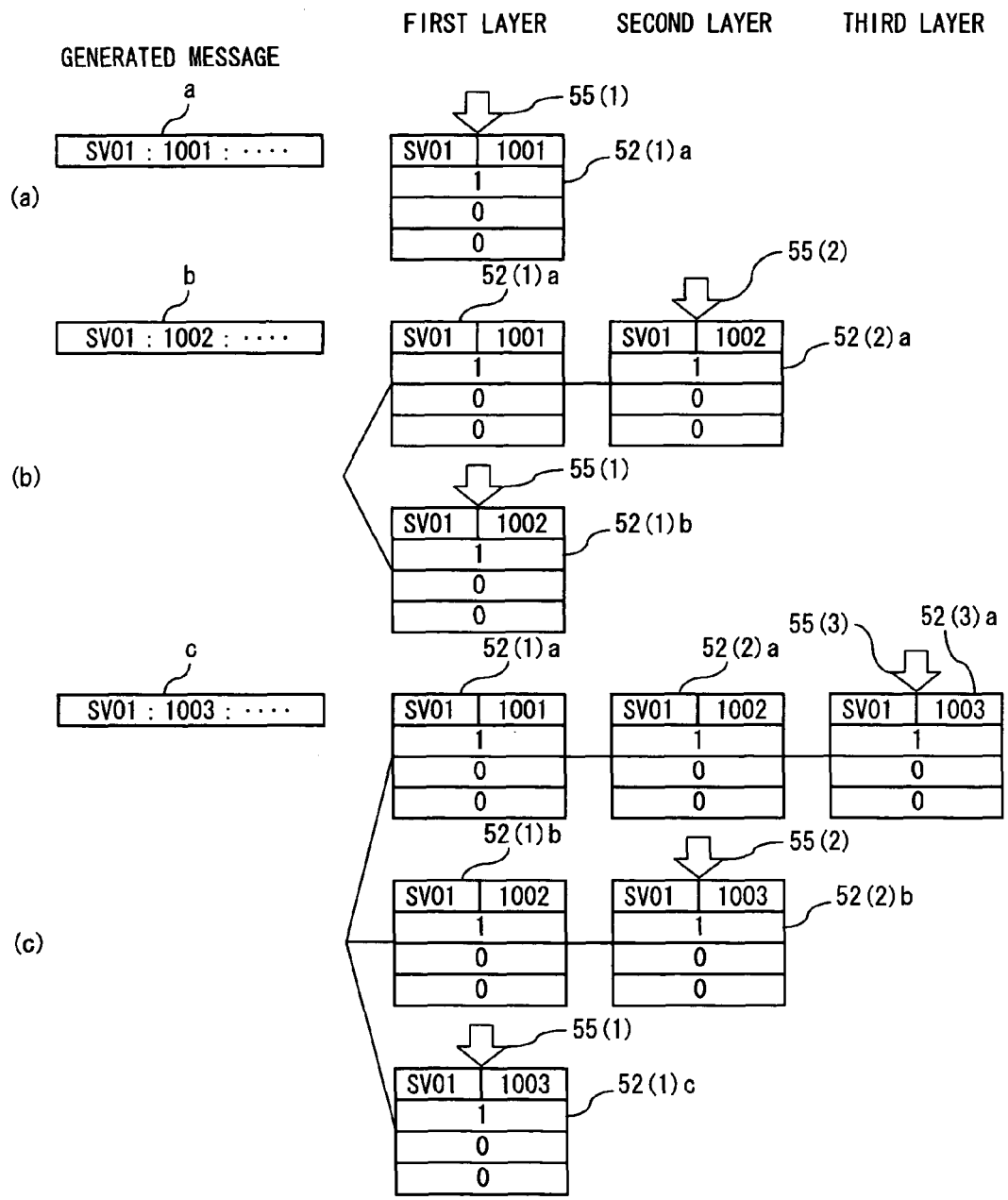
FIG. 9A is a diagram showing a detailed example of message information data generated in learning mode.
Figure 9B:
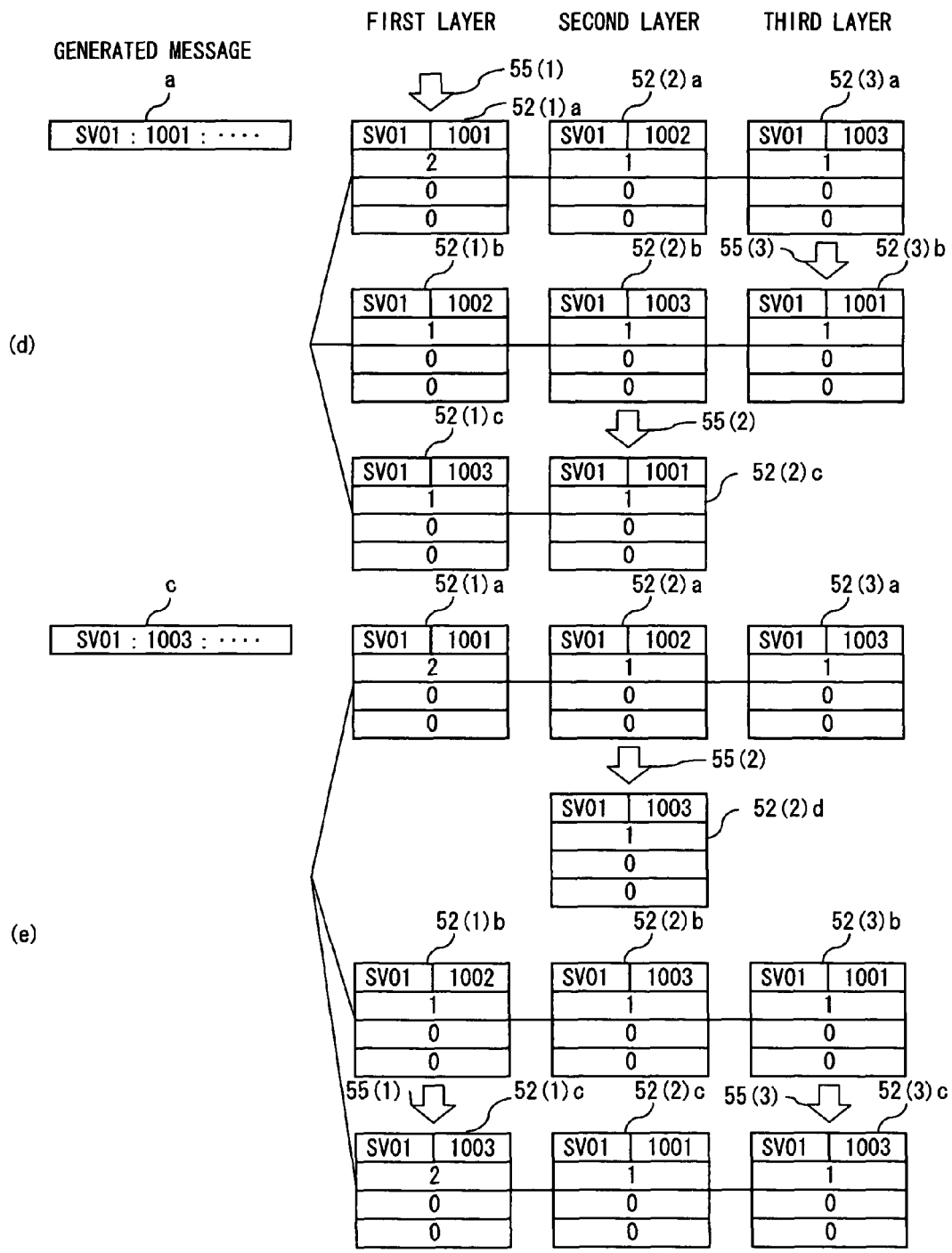
FIG. 9B is a diagram showing a detailed example of message information data generated in learning mode.

FIG. 9A and FIG. 9B are diagrams showing detailed examples of message information data 52 generated in learning mode.

The detailed examples (a) to (e), shown in FIG. 9A and FIG. 9B, show the process by which the message collection unit 2 collects messages and extracts normal patterns in learning mode. In order to simplify the explanation, only the configuration of message information data 52 is shown in the drawing.

The detailed examples (a) to (e), shown in FIG. 9A and FIG. 9B, show message information data 52 (a unit of normal pattern) generated by the learning unit 3 when the message collection unit 2 collects message a having identifier "SV011001", message b having identifier "SV011002", and message c having identifier "SV011003" in the following order:

Detailed example (a): first collects message a
Detailed example (b): collects message b under the conditions of detailed example (a)
Detailed example (c): collects message c under the conditions of detailed example (b)
Detailed example (d): collects message a under the conditions of detailed example (c)
Detailed example (e): collects message c under the conditions of detailed example (d)

Each detailed example is explained below, based on the flowchart (step S806 to S818) shown in FIG. 8A and FIG. 8B.

In detailed example (a), when the message collection unit 2 collects message a and notifies the learning unit 3, the learning unit 3 generates identifier "SV011001" from the header part of message a (step S806). Then, with this identifier as the search key, message information data 52 which has a corresponding identifier is retrieved from message information data 52 of the first layer.

At the time learning starts, message information data 52 does not exist under the time period data 51 of the current time period, and therefore, message information data 52(1)a is newly generated and identifier "SV011001" is stored after initialization (step S807).

Then, the value wherein one is added to the total frequency of message information data 52(1)a is stored. In the instance of message information data 52(1)a, it is initialized to 0, and therefore, the total frequency becomes 1 (step S808).

Next, temporary message information pointer 57(1) is generated and positioned to the corresponding message information data 52(1)a (step S809).

In the detailed example (a), no other message information pointers 55 exist, and therefore, temporary message information pointer 57(1) is changed to message information pointer 55(1) and processing is completed (step S818).

In the detailed example (b), when the message collection unit 2 collects message b and notifies the learning unit 3, the learning unit 3 generates identifier "SV011002" from the header part of message b (step S806). Then, with this identifier as the search key, message information data 52 which has a corresponding identifier is retrieved from message information data 52 of the first layer.

Because message information data 52 with identifier "SV011002" does not exist in the first layer, message information data 52(1)b is newly generated, initialized, and identifier "SV011002" is stored (step S807). Next, the value wherein one is added to the total frequency of message information data 52(1)b is stored (step S808).

Then, temporary message information pointer 57(1) is generated and positioned to the corresponding message information data 52(1)b (step S809).

Next, the message information pointer 55(1) of the first layer is retrieved. In detailed example (a), because message information pointer 55(1) positioning message information data 52(1)a exists, message information data 52(1)a is starting point (step S810).

Then, with regards to the second layer under message information data 52(1), message information data 52 having an identifier which matches search key is retrieved. In detailed example (b), there is no corresponding message information data 52, and therefore, message information data 52(2)a is newly generated, initialized, and identifier "SV011002" is stored (step S811).

Then, temporary message information pointer 57(2) is generated and is positioned to corresponding message information data 52(2)a (step S812).

Next, the value wherein 1 is added to the total frequency of the message information data 52(2)a is stored (step S813), and, with regards to message information pointer 55 of all layers, whether or not the processing in step S811 to S813 have been performed is checked (step S814) In detailed example (b), because processing has been performed for message information pointers 55 for all layers, message information pointer 55(1) is positioned to messaged information data 52(1)b which is positioned by temporary message information pointer 57(1), and message information pointer 55(2) is positioned to messaged information data 52(2)a which is positioned by temporary message information pointer 57(2).

Then, temporary message information pointers 57(1) and 57(2) are deleted and the processing is completed.

In detailed example (c), when the message collection unit 2 collects message c and notifies learning unit 3, the learning unit 3 generates identifier "SV011003" from the header part of message c (step S806). Then, with this identifier as search key, message information data 52 which has corresponding identifier is retrieved from the message information data 52 of the first layer.

In the first layer, because there is no message information data 52 which has the identifier "SV011003", message information data 52(1)c is newly generated, initialized, and the identifier "SV011003" is stored (step S807). Then, the value wherein 1 is added to the total frequency of message information data 52(1)c is stored (step S808).

Then, temporary message information pointer 57 is generated and positioned to the corresponding message information data 52(1)c (step S809).

Next, message information pointer 55(1) of the first layer is retrieved. In detailed example (b), because message information pointer 55(1) for positioning the message information data 52(1)b exists, message information data 52(1)bis the starting point (step S810).

Then, with regards to the second layer under message information data 52(1)b, message information data 52 having an identifier matching the search key is retrieved. In detailed example (b), because no corresponding message information data 52 exists, message information data 52(2)b is newly generated, initialized, and the identifier "SV011003" is stored (step S811).

Then, temporary information pointer 57(2) is generated and positioned to corresponding message information data 52(2)b (step S812).

Next, the value wherein 1 is added to the total frequency of message information data 52(2)b is stored (step S813) and whether or not processing of step S811 to step S813 have been performed with regards to all message information pointers 55 is checked (step S814).

In detailed example (b), because the message information pointer 55(2) positioning message information data 52(2) a exists in the second layer, message information data 52(2)a is the starting point (step S815).

Then, with regards to the third layer under corresponding message information data 52(2)a, message information data 52 having an identifier matching the search key is retrieved (step S811). In detailed example (b), because no corresponding message information data 52 exists, message information data 52(3)a is newly generated, initialized, and the identifier "SV011003" is stored.

Next, temporary message information pointer 57(3) is generated and positioned to corresponding message information data 52(3)a (step S812), and the value wherein 1 is added to the total frequency of the message information data 52(3)a is stored.

Finally, message information pointer 55(1) is positioned to the message information data 52(1)c positioned by temporary message information pointer 57(1), message information pointer 55(2) is positioned to the message information data 52(2)b positioned by temporary message information pointer 57(2), and message information pointer 55(3) is positioned to the message information data 52(3) a positioned by temporary message information pointer 57(3).

Then, temporary message information pointers 57(1) to 57(3) are deleted and the processing is completed.

In detailed example (d), when message collection unit 2 collects message a and notifies learning unit 3, learning unit 3 generates identifier "SV011001" from the header part of message a (step S806). Then, with its identifier as the search key, message information data 52 having a corresponding identifier is retrieved from message information data 52 of the first layer (step S807)

In the first layer, because message information data 52(1)a having the identifier "SV011001" exists, value 2 wherein one is added to the total frequency of corresponding message information data 52(1)a is stored (step S808), temporary message information pointer 57 is generated and positions the corresponding message information data 52(1)a (step S809).

Next, message information pointer 55(1) of the first layer is retrieved. In detailed example (c), because message information pointer 55(1) positioning message information data 52(1)c exists, message information data 52(1)a is the starting point (step S810).

Then, with regards to the second layer under message information data 52(1)a, message information data 52 having an identifier matching the search key is retrieved. In detailed example (c), because corresponding message information data 52 does not exist, message information data 52(2)c is newly generated, initialized, and the identifier "SV011001" is stored (step S811).

Then, temporary message information pointer 57(2) is generated and positioned to the corresponding message information data 52(2)c (step S812).

Next, the value wherein one is added to the total frequency of message information data 52(2)c is stored (step S813), and whether or not the processing of step S811 to S813 are performed with regards to all message information pointers 55 is checked (step S814).

In detailed example (c), because a message information pointer 55(2) positioning message information data 52(2)*b* exists in the second layer, message information data 52(2)*b* is the starting point (step S815).

Then, with regards to the third layer under the corresponding message information data 52(2)*b*, message information data 52 having an identifier matching the search key is retrieved (step S811). In detailed example (b), because corresponding message information data 52 does not exist, message information data 52(3)*b* is newly generated, initialized, and the identifier "SV011001" is stored.

Next, temporary message information pointer 57(3) is generated and positioned to the corresponding message information data 52(3)*b* (step S809), and the value wherein one is added to the total frequency of the corresponding information data 52(3)*b* is stored (step S813).

Finally, message information pointer 55(1) is positioned to the message information data 52(1)*a* positioned by temporary message information pointer 57(1), message information pointer 55(2) is positioned to the message information data 52(2)*c* positioned by temporary message information pointer 57(2), and message information pointer 55(3) is positioned to the message information data 52(3)*b* positioned by temporary message information pointer 57(3).

Then, temporary message information pointers 57(1) to 57(3) are deleted and processing is completed.

In detailed example (e), when message collection unit 2 collects message c and notifies learning unit 3, learning unit 3 generates identifier "SV011003" from the header part of message c (step S806). Then, with its identifier as the search key, message information data 52 having a corresponding identifier is retrieved from message information data 52 of the first layer (step S807).

In the first layer, because a message information data 52(1)*c* having the identifier "SV011003" exists, value 2 wherein one is added to the total frequency of corresponding message information data 52(1)*c* is stored (step S808), temporary message information pointer 57(1) is generated and positions the corresponding message information data 52(1)*c* (step S809).

Next, message information pointer 55(1) of the first layer is retrieved. In detailed example (d), because message information pointer 55(1) positioning message information data 52(1)*a* exists, message information data 52(1)*a* is the starting point (step S810)

Then, with regards to the second layer under message information data 52(1)*a*, message information data 52 having an identifier matching the search key is retrieved. In detailed example (d), because corresponding message information data 52 does not exist, message information data 52(2)*d* is newly generated, initialized, and the identifier "SV011003" is stored (step S811).

Then, temporary message information pointer 57(2) is generated and positioned to the corresponding message information data 52(2)*d* (step S812).

Next, the value wherein one is added to the total frequency of message information data 52(2)*d* is stored (step S813), and whether or not the processing of steps S811 to S813 are performed with regards to all message information pointers 55 is checked (step S814).

In detailed example (d), because a message information pointer 55(2) positioning message information data 52(2)*c* exists in the second layer, message information data 52(2)*c* is the starting point (step S815).

Then, with regards to the third layer under the corresponding message information data 52(2)*c*, message information data 52 having an identifier matching the search key is retrieved (step S811). In detailed example (d), because corresponding message information data 52 does not exist, message information data 52(3)*c* is newly generated, initialized, and the identifier "SV011003" is stored.

Next, temporary message information pointer 57(3) is generated and positioned to the corresponding message information data 52(3)*c* (step S812), and the value wherein one is added to the total frequency of the corresponding information data 52(3)*c* is stored (step S813).

Finally, message information pointer 55(1) is positioned to the message information data 52(1)*c* positioned by temporary message information pointer 57(1), message information pointer 55(2) is positioned to the message information data 52(2)*d* positioned by temporary message information pointer 57(2), and message information pointer 55(3) is positioned to the message information data 52(3)*c* positioned by temporary message information pointer 57(3).

Then, temporary message information pointers 57(1) to 57(3) are deleted and processing is completed.

FIG. 10 is a flowchart showing the switching process from learning mode to operation mode.

When instructions to switch from learning mode to operation mode are given from the input device 25, CPU 20 starts processing for switching from learning mode to operation mode (step S1000).

In step S1001, day-of-the-week pointer 53 is positioned to the day-of-the-week data 50 indicating Monday. Then, in step 1002, time period pointer 54 is positioned to time period data 51 indicating the time period, "AM 0:00 to 0:30".

Furthermore, in step S1003, message information pointer 55(1) of the first layer is positioned to the first message information data 52(1).

Then, in step S1004, CPU20 reads out learning frequency of the time period data 51 positioned by the time period pointer 54 and the total frequency of message information data 52(1) positioned by message information pointer 57(1), calculates "total frequency divided by learning frequency" and determines the average frequency. Then, the determined average frequency is stored to the average frequency on corresponding message information data 52(1).

The foregoing average frequency calculation processing is performed for message information data 52 of all layers under the corresponding time period data 51 (step S1005). Then, after the calculation for average frequency for all message information data 52 under corresponding time period data 51 is completed, CPU20 advances the processing to step 1006.

In step S1006, CPU20 sets the corresponding time period pointer 54 to the time period data 51*b* indicating the next time period. Then, with regards to all time period data 51 under the corresponding day-of-the-week data 50, average frequency calculation processing of step S1004 to step S1005 is performed (step S1007).

Furthermore, CPU20 sets the corresponding day-of-the-week pointer 53 to the day-of-the-week data 50 indicating the next day-of-the-week (step S1008) and repeatedly performs the processing in steps S1004 to S1008 until the processing in steps S1004 to S1008 are completed for all day-of-the-week data 50 (step S1009).

Through the foregoing process, CPU 20 clears the day-of-the-week pointer 53 and the time period pointer 54 when the calculation of the average frequency of all message information data 52 of normal patterns is completed and ends processing.

Figure 11B:
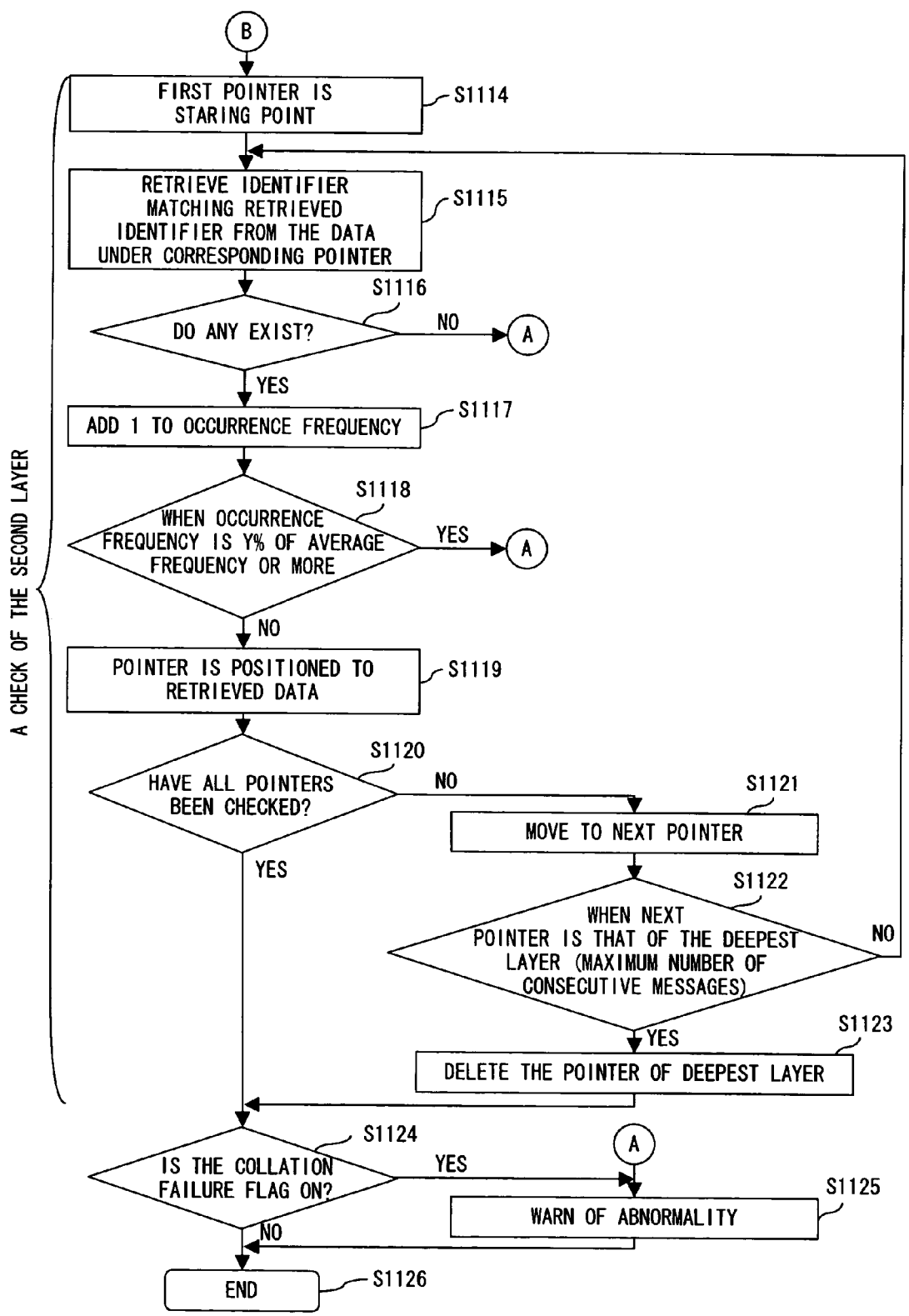
FIG. 11B is a flowchart showing the details of processing when the message abnormality automatic detection device according to this embodiment is in operation mode.

FIG. 11A and FIG. 11B are flowcharts showing the details of processing when the message abnormality automatic detection device 1 according to this embodiment is in operation mode.

When the message abnormality automatic detection device 1 is set to operation mode, the collation unit 5 starts collation processing and advances the processing to step S1101.

In step S1101, the collation unit 5 acquires the current day of the week from the timer function or the like provided in the message abnormality automatic detection device 1. Furthermore, in step S1102, the current time is acquired from the timer function or the like provided in the message abnormality automatic detection device 1.

When the current day of the week and time are acquired, the collation unit 5 advances the processing to step S1103. Then, whether or not the day of the week and the time period (time) corresponding to the day-of-the-week data 50 and time period data 51 positioned by day-of-the-week pointer 53 and time period pointer 54 and the current day of the week and time period (time) acquired in steps S1101 and S1102 match is checked.

If they match, the processing advances to step S1108. In addition, if they do not match, the processing advances to step S1104.

In step S1104, the collation unit 5 refers the minimum reference value (%) stored in a predetermined address of the definition unit 7. Then, with regards to all message information data 52 under time period data 51 positioned by time period pointer 54, the value of the average frequency multiplied by the minimum reference value (hereinafter referred to as "minimum threshold") is compared with occurrence frequency.

If occurrence frequency is not lower than the minimum threshold, as a result of comparison, the processing advances to step S1107. In addition, if occurrence frequency is lower than the minimum threshold, as a result of comparison, it is determined that there is abnormality in the day of the week and time period message indicated by the corresponding day-of-the-week data 50 and time period data 51.

In other words, because the appearance frequency of each message comprising normal patterns is less than what is normal, it is determined that the message is abnormal.

Then, the abnormality detection flag is turned ON and the processing is advanced to step S1107 (steps S1105 and S1106). The abnormality detection flag secures dedicated area within memory 21, for example.

In step S1107, the collation unit 5 positions day-of-the-week pointer 53 and time period pointer 54 to the day-of-the-week data 50 and time period data 51 corresponding to the current day of the week and time period acquired in steps S1101 and S1102.

When day-of-the-week pointer 53 and time period pointer 54 are positioned, the collation unit 5 performs predetermined processing for the message information data 52 of the first layer under the corresponding time period pointer 54 in the processing of steps S1108 to S1113, shown below.

In step S1108, the collation unit 5 generates an identifier from the collected message. Then, with the identifier as search key, the collation unit 5 retrieves message information data 52 of the first layer under corresponding time period pointer 54 (step S1109).

If corresponding message information data 52 cannot be found, the processing advances to step S1125 and message abnormality warning is issued.

In addition, if corresponding message information data 52 is found, the processing advances to step S11111 and the value wherein one is added to the occurrence frequency of the corresponding message information data 52 is stored.

Furthermore, the collation unit 5 refers the maximum reference value (%) stored in a predetermined address of the definition unit 7. Then, with regards to all message information data 52, the value of the average frequency multiplied by the maximum reference value (hereinafter referred to as "maximum threshold") is compared with occurrence frequency (step S1112).

If occurrence frequency is not higher than the maximum threshold, as a result of comparison, the processing advances to step S1113. In addition, if occurrence frequency is higher than the maximum threshold, as a result of comparison, it is determined that there is abnormality in the day of the week and time period message indicated by the corresponding day-of-the-week data 50 and time period data 51.

In other words, because the appearance frequency of each message comprising normal patterns is more than what is normal, it is determined that the message is abnormal. Then, the processing is advanced to step S1125, and message abnormality warning is issued.

In step S1113, the collation unit 5 generates a temporary information pointer 57(1) and positions it to the corresponding message information data 52.

With regards to the message information data 52 of the first layer under the corresponding timer period pointer 54, when predetermined processing is completed through the foregoing processing in steps S1108 to S1113, the collation unit 5 performs processing of steps S1114 to S1123, shown below, for message information data 52 of the second and subsequent layers under the corresponding time period pointer 54.

In step S1114, the collation unit 5 retrieves message information pointer 55(1) in the first layer. Then, the message information data 52 positioned by corresponding message information pointer 55(1) becomes the starting point.

Next, with regards to the message information data 52 in the layer under the corresponding message information data 52, message information data 52 matching the search key is retrieved (step S1115).

If corresponding message information data 52 cannot be found, the processing advances to step S1125. In addition, if corresponding message information data 52 is found, the processing is advanced to step S1117 and the value wherein one is added to the occurrence frequency of the corresponding message information data 52 is stored.

In step S1118, the collation unit 5 calculates the maximum threshold with regards to the corresponding message information data 52 and compares the calculated maximum threshold and average frequency.

If occurrence frequency is not higher than the maximum threshold, as a result of comparison, the processing advances to step S1119. In addition, if occurrence frequency is higher than the minimum threshold, as a result of comparison, it is determined that there is abnormality in the day of the week and time period message indicated by the corresponding day-of-the-week data 50 and time period data 51, as in step S1112, and the processing advances to step S1125.

In step S1119, the collation unit 5 generates temporary message information pointer 57(n) in corresponding layer (nth layer) and then positions the corresponding message information data 52.

With regards to the message information pointer 55 of all layers, if the processing of steps S1115 to S1119 is completed, the processing advances to step S1125. In addition, if message information pointer 55 to which the processing of steps S1115 to S1119 has not been completed exists, the collation unit 5 advances the processing to step S1121.

In step S1121, the collation unit 5 retrieves the message information pointer 55 in the next layer. Then, the message information data 52 positioned by the corresponding message information pointer 55 becomes the starting point.

In step S1122, the collation unit 5 refers the maximum number of consecutive messages stored to a predetermined address in the definition unit 7. Then, if the number of corresponding layers is the same as the maximum consecutive message number, the corresponding message information pointer 55 is deleted (step S1123), and the processing advances to step S1125.

In addition, if the number of corresponding layers is not the same as the maximum consecutive message number, the processing moves to step S1115. Then, with regards to the message information pointer 55 of all layers, the processing of steps S1115 to S1122 is performed repeatedly.

In step S1124, the collation unit 5 checks whether or not the collation failure flag is ON. Then, if the collation failure flag is not ON, the processing is terminated normally (step S1126).

In addition, if the collation failure flag is ON, the processing advances to step S1125, the warning unit 6 issues a warning, and the processing advances to step S1206.

In step S1126, the collation unit 5 positions message information data 52, positioned by the temporary message information pointer 57 generated in each layer, to the message information pointer 55 of each layer, deletes all temporary message information pointer 57 and ends the processing.

Figure 12:
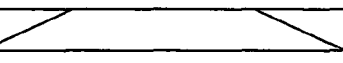
FIG. 12 is a diagram showing an example of a warning unit display.

FIG. 12 is a diagram showing a presentation example of when the warning unit 6 issues a warning to display 9.

The warning shown in FIG. 12 shows the warning screen when the message abnormality automatic determination device 1 according to this embodiment detects consecutive message A "SV01: 1001: Abnormal return of transmission request" and message B "SV01: 1002: retransmission successful" generated from distributed system 8 ten times during a predetermined time period.

In addition, it shows that the average frequency of consecutive message A and message B in the corresponding time period of the normal pattern is three times.

Although the warning screen shown in FIG. 12 is that shown in display 9, the same displayed data can also be sent to a predetermined e-mail address.

In addition, the warning screen shown in FIG. 12 is an example and the purpose is naturally not to limit thereto.

A message abnormality automatic detection device according to this embodiment may include: a message collection unit for collecting messages generated by a distributed system; a normal pattern memory unit for storing normal pattern of which the constituent element is message information data which are a combination of one or two or more consecutive messages generated when the distributed system is operating normally and have at least identifiers which uniquely identify the messages and the number of times each message indicated by the identifiers are generated; and a collation unit for referencing the normal patterns stored within the normal pattern memory unit, retrieving the identifier which matches the identifier of the message collected within the message collection unit, counting the number of times the message indicated by the identifier is generated if relevant identifier exists, and determining abnormality if the number of times generated is higher or lower than a predetermined value or if relevant identifier does not exist.

In the message abnormality automatic detection device, the normal pattern may include: a plurality of day-of-the-week data indicating the date classified based on predetermined rules; a plurality of time period data indicating time period obtained by arbitrarily dividing a predetermined period of a date indicated by the day-of-the-week data or a date indicated by the day-of-the-week data; and a message information data in the time period indicated by the time period data.

In the message abnormality automatic detection device, the message information data may have a tree-structure having a predetermined number of layers; and the collation unit may set the message information data comprising the occurrence frequency, which the collation unit counted previously, as a starting point, and retrieve identifier matching the identifier of message collected in the message collection unit from the identifier of message information data of the layer directly below the starting point.

The message abnormality automatic detection device may further include a warning unit for outputting message determined by the collation unit to be abnormal.

In the message abnormality automatic detection device, the identifier may include a message ID for identifying message content and a resource name for generating the message.

The message abnormality automatic detection device may further include a learning unit for extracting normal pattern of which the constituent element is message information data which is a combination of one or two or more consecutive messages generated when the distributed system is operating normally and has at least identifiers which uniquely identify the messages and the total number of times each message indicated by the identifiers are generated and, at the same time, counting the total frequency.

In the message abnormality automatic detection device, the warning unit may further include a blocking unit for blocking the output of messages determined by the collation unit to be abnormal.

As described above, the message abnormality automatic determination device 1 according to this embodiment automatically learns the normal pattern of a message generated from distributed system 8, and therefore, for example, it is not necessary to manually set whether or not to output the message for every message, such as with filtering definition of messages.

In addition, the learning unit 3 according to this embodiment learns not only one message but a plurality of consecutive message patterns and generates normal patterns. Therefore, with regards to messages which have meaning as a plurality of consecutive messages, it can be determined if it is abnormal or not. Furthermore, as a result, a more accurate warning is possible, even is a more complicated distributed system 8.

Furthermore, as shown in FIG. 5, the normal pattern according to this embodiment comprises day-of-the-week data 50 and time period data 51, and therefore, message patterns can be learned by date or days of the week/time period. Thus, this can be applied easily in a distributed system 8 wherein operation types differ with dates and days of the week/time period.

In addition, the collation unit 5, according to this embodiment, determines instances wherein the number of detected messages is more than the maximum threshold and lower than the minimum threshold to be abnormal messages, when compared with normal patterns. In this way, not only abnormalities when more messages than normal are generated from distributed system 8, but also abnormalities when messages which normally should be output are not generated from the distributed system 8 can be detected.

For example, messages stating that the activation of a required service has been terminated normally are messages which should be normally output, and abnormalities when such messages are not output from the distributed system 8 can be detected.

In addition, normally, message ID is determined according to resource (for example, server or software) Furthermore, in distributed system 8, messages having the same messages ID are sometimes output from differing resources, and therefore, there are instances wherein messages cannot be differentiated.

On the other hand, because identifiers according to the present invention comprise message ID and resource name, messages can be differentiated clearly in distributed system 8, and therefore are effective in enabling accurate understanding of normal patterns.

What is claimed is:

1. A detection device comprising:
learning means for extracting a sequence pattern of at least two consecutive messages from a first group of messages generated by a system, and for counting a number of the sequence pattern of messages in the first group;
memory means for storing the sequence pattern and the number of the sequence pattern of messages in the first group; and
collation means for referencing the sequence pattern and the number of the sequence pattern of the messages in the first group stored in the memory means, for counting a number of the sequence pattern of messages in a second group of messages generated by the system, and for determining abnormality when the number of the sequence pattern of the messages in the second group is not within a range set using the number of the sequence pattern of messages in the first group,
the collation means is to determine the abnormality when a proportion of the counted number of the sequence pattern of messages in the second group to the number of the sequence pattern of messages in the first group is equal to or larger than a certain number.

2. The detection device according to claim 1 wherein,
a period in which the first group is obtained and a period in which the second group is obtained are included in a same time period and a same day of different weeks.

3. The detection device according to claim 1 wherein,
the learning means is to extract a plurality of sequence patterns from the first group,
the memory means, for each of the extracted plurality of sequence patterns from the first group, stores the number of the sequence pattern of messages in the first group in the memory means,
the learning means, for each of the extracted plurality of sequence patterns from the first group, counts the number of the sequence pattern of messages in the second group, and
the collation means determines the abnormality when a proportion of the number of the sequence pattern of messages in the second group of at least any one of the plurality of sequence patterns to the number of the sequence pattern of messages in the first group is equal to or larger than a certain number.

4. The detection device according to claim 3 wherein,
the extracted plurality of sequence patterns include a plurality of sequence patterns, a part of which prefix-matches, and the sequence patterns of a tree-structure is formed by aggregating the matched part, and
each message in the plurality of sequence patterns included in the tree-structure is associated with the number of the sequence pattern of messages in the first group that is using the sequence pattern including messages existing on a way from a root end to the each message of the tree-structure including the each message.

5. The detection device according to claim 4 wherein,
from among the number of the sequence pattern of messages in the first group associated with a message positioned on the root end of the tree-structure and stored in the memory means, the number of the sequence pattern of messages in the first group associated with a message indicating a content that is same as a first message obtained after the first group is selected,
from among the number of the sequence pattern of messages in the first group stored in the memory means, the number of the sequence pattern of messages in the first group being under the selected number of the sequence pattern of messages in the first group and being positioned in a lower hierarchy in the tree-structure, the number of the sequence pattern of messages in the first group associated with a message indicating a content same as a second message obtained subsequent to the first message is selected and the selection of the previously selected number of the sequence pattern of messages in the first group is released,
an abnormality is determined when number of times that a proportion of the number of the sequence pattern of messages in the first group stored in the memory means is selected to the number of the sequence pattern of messages in the first group is equal to or larger than the certain number.

6. A detection device comprising:
learning means for extracting a sequence pattern of at least two consecutive messages from a first group of messages obtained from a device within a first period of time, and for counting a number of the sequence pattern of messages in the first group;
memory means for storing the sequence pattern and the number of the sequence pattern of messages in the first group; and
collation means for referencing the sequence pattern and the number of the sequence pattern of the messages in the first group stored in the memory means, for counting a number of the sequence pattern of messages in a second group of messages obtained within a second period of time that is after the first period of time, and for determining abnormality when the number of the sequence pattern of the messages in the second group is not within a range set using the number of the sequence pattern of messages in the first group,
wherein the collation means is to determine the abnormality when a proportion of the counted number of the sequence pattern of messages in the second group to the number of the sequence pattern of messages in the first group is equal to or smaller than the certain number.

7. The detection device according to claim 6 wherein,
the first period of time and the second period of time are included in a same time period and a same day of different weeks.

8. A detection device comprising:
learning means for extracting a sequence pattern of at least two consecutive messages from a first group of messages generated by a system, and for counting a number of the sequence pattern of messages in the first group;
memory means for storing the sequence pattern and the number of the sequence pattern of messages in the first group; and
collation means for selecting a sequence pattern of the extracted sequence patterns, which includes a message indicating a content same as a first message obtained after the first group of messages, and for determining abnormality when the selected sequence pattern does not include a message indicating a content same as a second message obtained subsequent to the first message as a message obtained subsequent to the message indicating the content same as the first message;

wherein the selection of the sequence pattern of the selected sequence patterns, which does not include the message indicating the content same as the second message as a message obtained subsequent to the first message, is released, and a sequence pattern of the extracted sequence patterns, which includes a message indicating a content same as the second message as a message obtained first is further selected.

9. The detection device according to claim 8 wherein, when none of the extracted sequence pattern includes the message indicating the content same as the first message, a notice including the first message is output.

10. A detection method causing a computer to execute:

extracting a sequence pattern of at least two consecutive messages from a first group of messages generated by a system, and counting a number of the sequence pattern of messages in the first group;

storing the sequence pattern and the number of the sequence pattern of messages in the first group;

referencing the sequence pattern and the number of the sequence pattern of the messages in the first group stored in the memory means, counting a number of the sequence pattern of messages in a second group of messages generated by the system, and determining abnormality when the number of the sequence pattern of the messages in the second group is not within a range set using the number of the sequence pattern of messages in the first group; and determining the abnormality when a proportion of the counted number of the sequence pattern of messages in the second group to the number of the sequence pattern of messages in the first group is equal to or larger than a certain number.

11. A detection device comprising:

a memory, and a processor which executes:

extracting a sequence pattern of at least two consecutive messages from a first group of messages generated by a system, and counting a number of the sequence pattern of messages in the first group;

storing the sequence pattern and the number of the sequence pattern of messages in the first group on the memory;

referencing the sequence pattern and the number of the sequence pattern of the messages in the first group stored in the memory, counting a number of the sequence pattern of messages in a second group of messages generated by the system, and determining abnormality when the number of the sequence pattern of the messages in the second group is not within a range set using the number of the sequence pattern of messages in the first group; and determining the abnormality when a proportion of the counted number of the sequence pattern of messages in the second group to the number of the sequence pattern of messages in the first group is equal to or larger than a certain number.

* * * * *